United States Patent
Prommel et al.

(10) Patent No.: US 6,766,972 B1
(45) Date of Patent: Jul. 27, 2004

(54) ROTARY CHEESE GRATER WITH PRESS PLATE SEAL

(75) Inventors: Mark D. Prommel, New York, NY (US); Kevin R. Lozeau, Ridge, NY (US)

(73) Assignee: WKI Holding Company, Inc., Reston, VA (US)

( * ) Notice: Subject to any disclaimer, the term of this patent is extended or adjusted under 35 U.S.C. 154(b) by 0 days.

(21) Appl. No.: 10/291,258

(22) Filed: Nov. 8, 2002

(51) Int. Cl.[7] .............................................. B02C 17/02
(52) U.S. Cl. ..................... 241/93; 241/93; 241/169.1; 241/273.3
(58) Field of Search ............................ 241/169.1, 91, 241/93, 94, 168, 169, 273.1, 273.2, 273.3

(56) References Cited

U.S. PATENT DOCUMENTS

| | | | |
|---|---|---|---|
| 2,128,792 A | * 8/1938 | Berarducci | 241/93 |
| 2,804,896 A | * 9/1957 | Silberberg | 241/273.3 |
| 3,784,118 A | * 1/1974 | Hurwitz | 241/282.1 |
| 4,127,375 A | 11/1978 | Nelson | |
| 5,071,663 A | 12/1991 | Dugan | |
| 5,163,628 A | 11/1992 | Arnold | |
| 5,364,037 A | * 11/1994 | Bigelow | 241/93 |
| 5,421,089 A | 6/1995 | Dubus et al. | |
| 5,660,341 A | 8/1997 | Perkins et al. | |
| 5,702,061 A | 12/1997 | Kennedy et al. | |
| 5,803,378 A | 9/1998 | Wolters | |
| 5,813,564 A | 9/1998 | Luo | |
| 5,902,444 A | 5/1999 | Falkner et al. | |
| 5,954,241 A | 9/1999 | Huang | |
| 5,967,434 A | 10/1999 | Virk | |
| 6,210,352 B1 | 4/2001 | Williams et al. | |
| 6,244,529 B1 | * 6/2001 | Tardif et al. | 241/93 |
| 6,322,246 B1 | 11/2001 | Leung | |
| 6,332,551 B1 | 12/2001 | Copeland | |
| 6,409,107 B1 | * 6/2002 | Romano | 241/94 |
| 6,412,717 B1 | * 7/2002 | Menelaou | 241/92 |

FOREIGN PATENT DOCUMENTS

| | | |
|---|---|---|
| CH | 689010 | 7/1998 |
| DE | 7344585 | 3/1974 |
| DE | GM 75 04 125 | 8/1975 |
| DE | G 82 02 070.1 | 6/1982 |
| DE | G 89 01 885.0 | 7/1989 |
| DE | 3903635 | 8/1990 |
| DE | 298 02 843 U 1 | 10/1998 |

OTHER PUBLICATIONS

Copy of Web page showing Zyliss Grater downloaded from www.cooking.com/products/shprodde.asp?SKU=104285 on Sep. 24, 2001.

* cited by examiner

Primary Examiner—Ed Tolan
(74) Attorney, Agent, or Firm—Seyfarth Shaw LLP

(57) ABSTRACT

A rotary hand grater has a housing which defines a hopper communicating with an open-ended cylindrical grating chamber in which a grating drum rotates for grating the contents of the hopper. The chamber is closed at one end by handle structure for rotating the grating drum and at the other end by a removable cap. A press plate is movable into and out of the hopper for pressing food against the grating tube. A flexible and resilient seal is clamped between the press plate and a backing surface on a plunger arm for sealing engagement with the hopper side walls and cooperation with the handle structure and the cap to seal the hopper and the chamber.

20 Claims, 5 Drawing Sheets

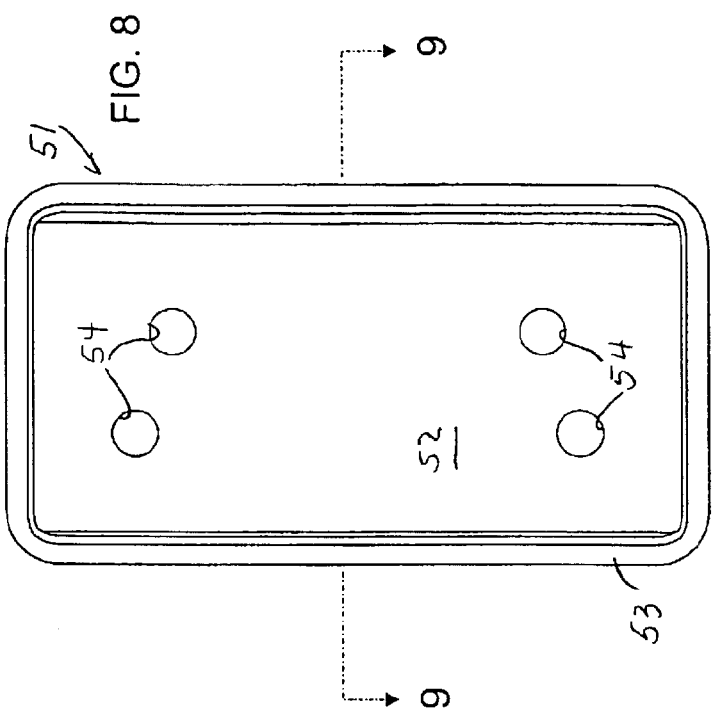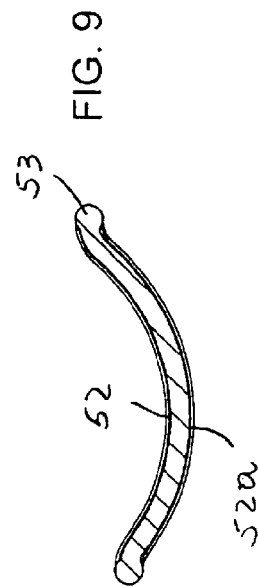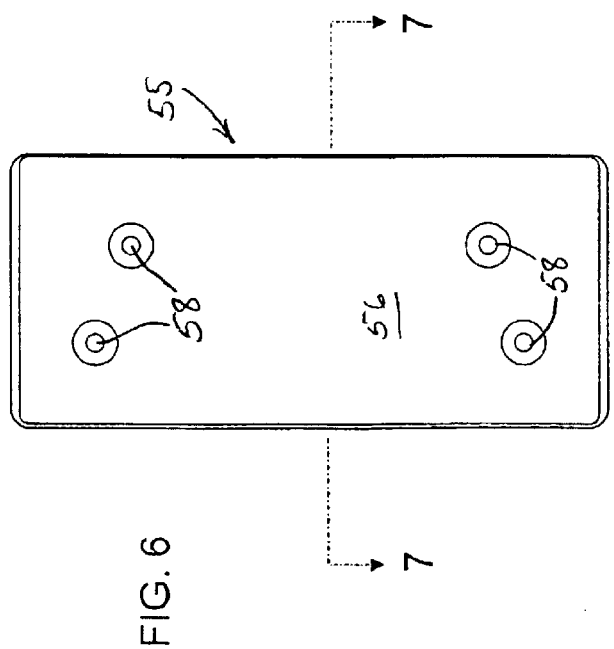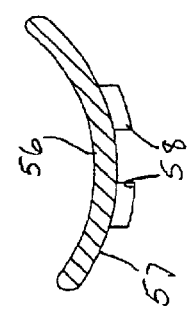
FIG. 8
FIG. 9
FIG. 6
FIG. 7

US 6,766,972 B1

ROTARY CHEESE GRATER WITH PRESS PLATE SEAL

BACKGROUND

This application relates to hand-operated food grating devices and, in particular, to rotary drum-type graters of the type which are commonly used for grating cheese and other similar food products.

A number of different hand-operated rotary drum-type graters have heretofore been provided. Typically, in such graters there is a housing defining an open-top hopper communicating at its lower end with a cylindrical grating chamber in which is disposed a grating drum, rotatable by a crank mechanism attached to the drum at one end thereof for grating the contents of the hopper. A handle extends from the housing and is pivoted at its distal end to another handle which carries a press plate moveable into and out of the hopper between a loading condition, removed from the hopper to permit food items to be loaded therein, and a pressing condition, disposable in the hopper for engagement with the food to press it against the grating drum. The grating drum is open at one end and there is substantial clearance between the press plate and the sidewalls of the hopper to permit free and unobstructed movement of the press plate into and out of the hopper.

In use, the two handles are clamped together with one of the user's hands for pressing the food items against the grating drum, which is rotated manually by the user's other hand. The grated food products fall through grating openings in the grating drum into the interior of the drum for discharge from the open end thereof.

Because of the open end of the grating drum and the clearance space between the press plate and the hopper sidewall, the interior of the grating drum is exposed to the atmosphere. Thus, it is typically necessary, after each use, that the grater be thoroughly cleaned. Furthermore, the space between the press plate and the hopper sidewall may permit food items to pass therebetween in operation and not be effectively pressed against the grating drum.

SUMMARY

There is disclosed in this application an improved food grater which avoids disadvantages of prior graters while affording additional structural and operating advantages.

An improved food grater includes a housing defining a food hopper having a peripheral wall structure. A grating mechanism is carried by the housing and communicates with the hopper for grating food contained therein. A press plate is coupled to the housing for movement between an open condition removed from the hopper and a closed condition disposed in the hopper for engagement with food disposed therein. Seal structure is coupled to the press plate and is disposable in sealing engagement with the peripheral wall structure when the press plate is in its closed condition.

The housing may define a grating chamber beneath the hopper in which the grating mechanism is disposed. The chamber is closed at one end by handle structure for operating the grater and is closeable at an opposite end by a removable cap so that the handle structure and cap may cooperate with the seal structure to effectively seal the hopper and the grating chamber.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 5 is a bottom plan view of the upper handle and backing plate of the grater of FIG. 1;

FIG. 6 is an enlarged, top plan view of the press plate of the grater of FIG. 1;

FIG. 7 is a sectional view taken along the line 7—7 in FIG. 6;

FIG. 8 is an enlarged, top plan view of the seal member of the grater of FIG. 1; and FIG. 9 is a sectional view taken along the line 9—9 in FIG. 8.

DETAILED DESCRIPTION

Figure 1:
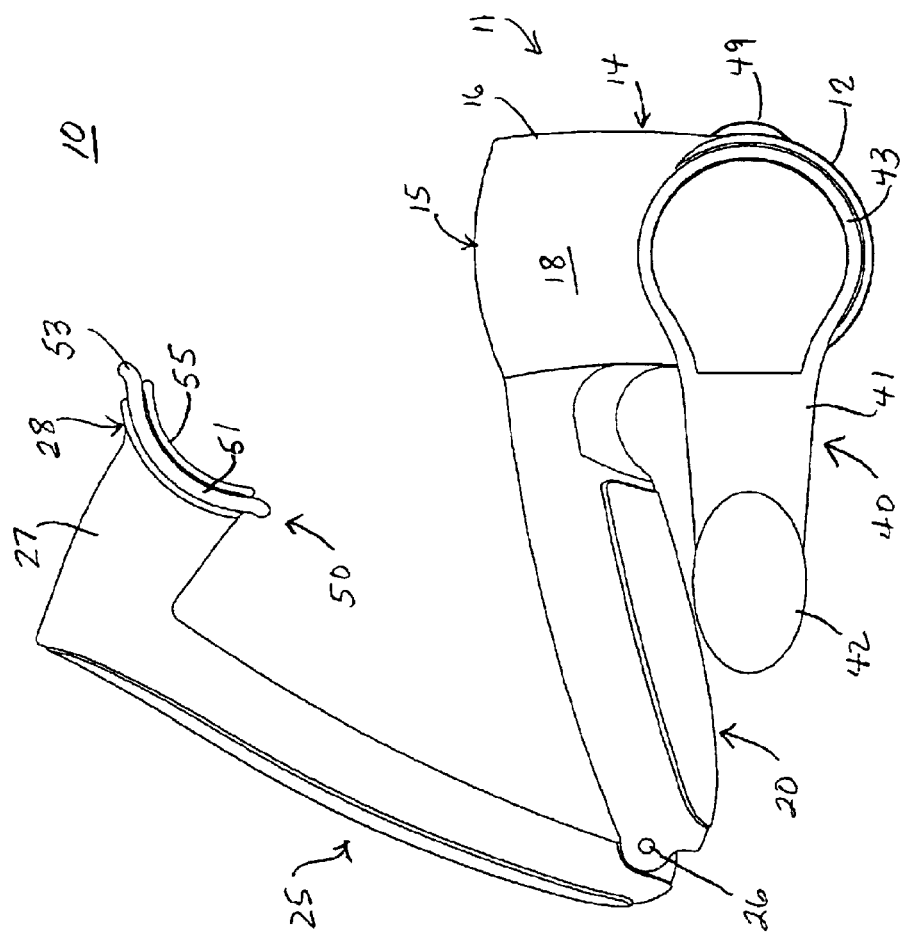
FIG. 1 is a side elevational view of a food grater with a press plate disposed out of a food hopper.
Figure 2:
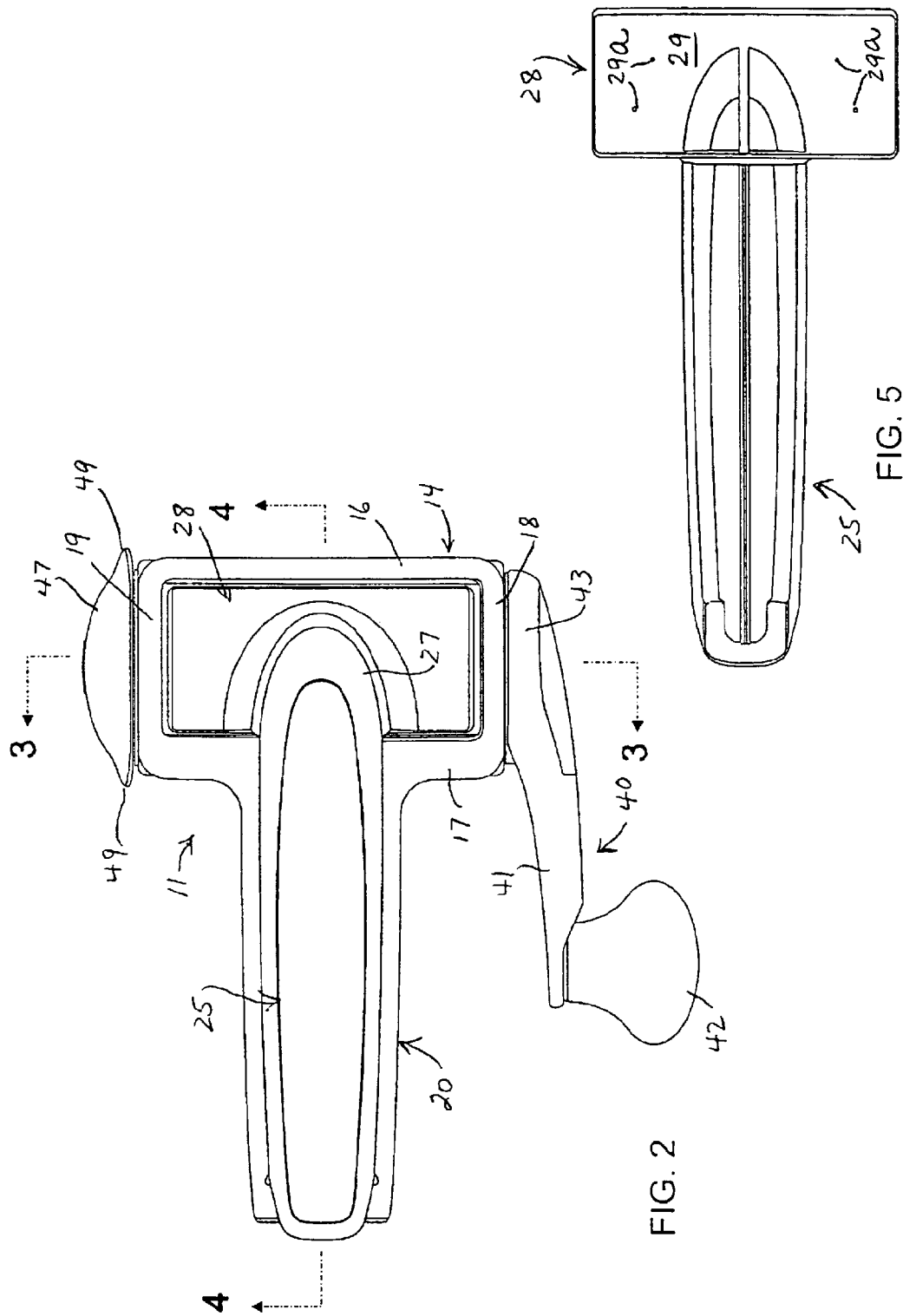
FIG. 2 is a top plan view of the food grater of FIG. 1, with the press plate disposed in the hopper and adjacent to a grating mechanism.
Figure 3:
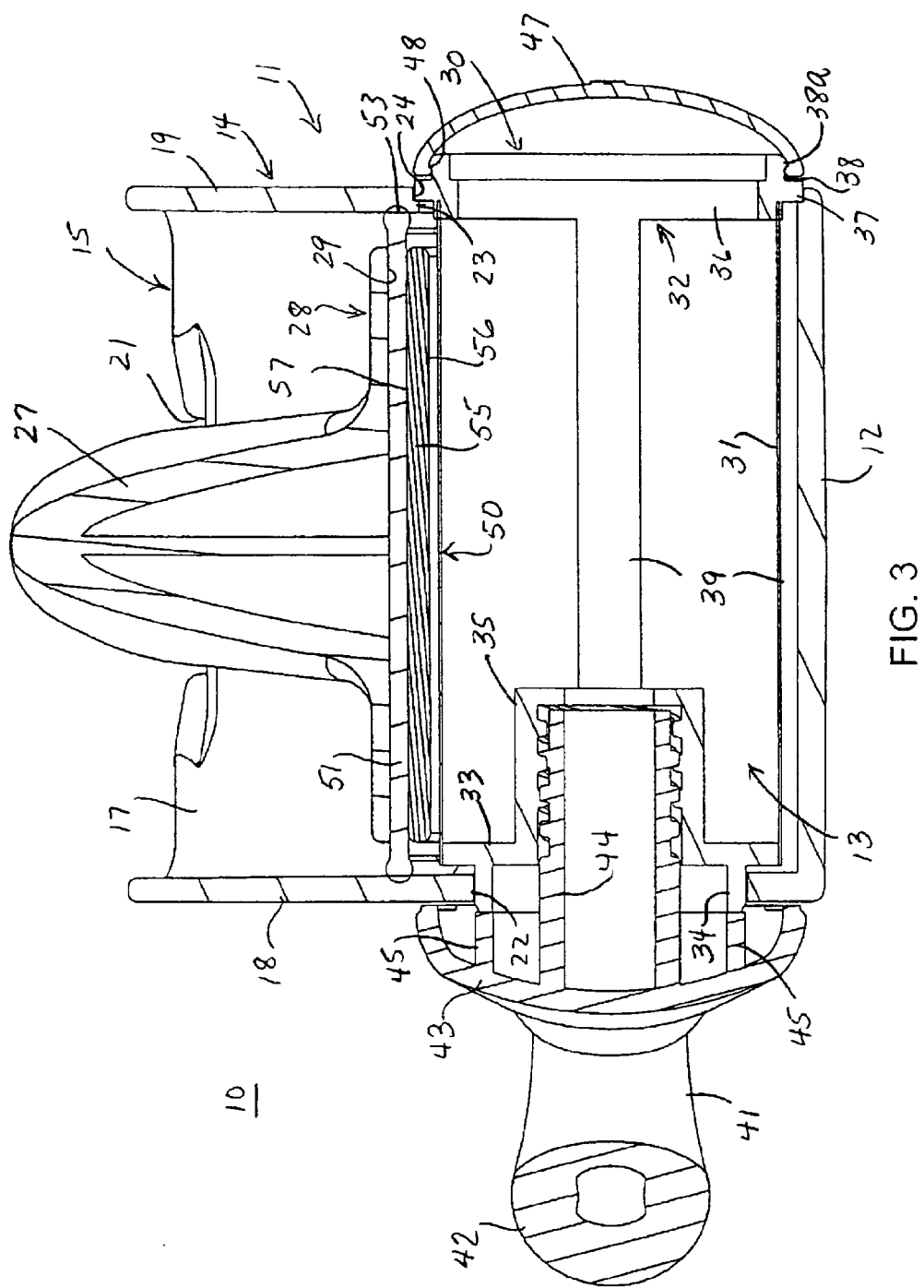
FIG. 3 is an enlarged sectional view taken along the line 3—3 in FIG. 2.
Figure 4:
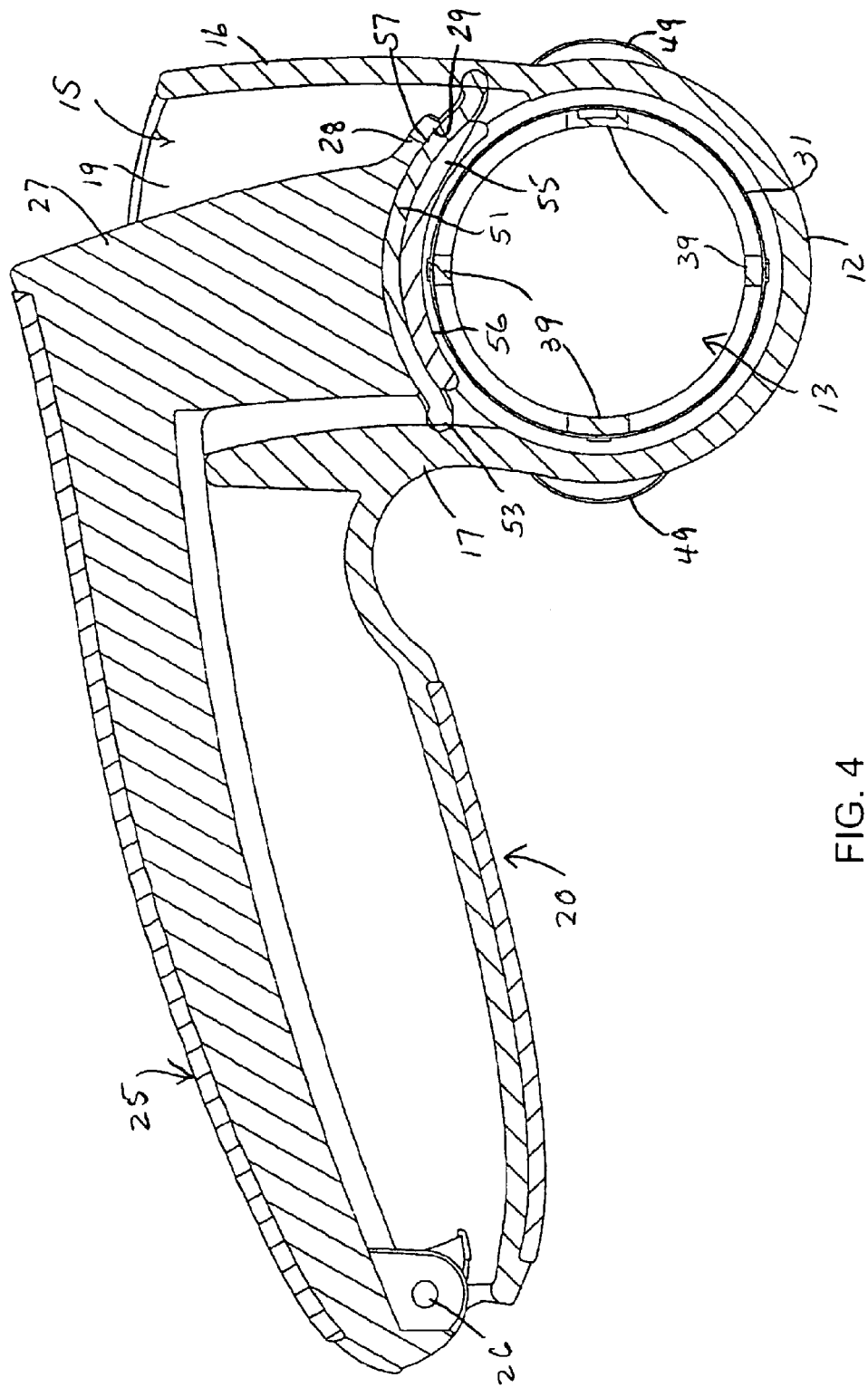
FIG. 4 is an enlarged sectional view taken along the line 4—4 in FIG. 2.

Referring to FIGS. 1–5, there is illustrated a food grater, generally designated by the numeral 10, which includes a housing 11 having a part-cylindrical bottom wall 12 which defines therein a generally cylindrical grating chamber 13 (FIGS. 3 and 4). Integral with the bottom wall 12 and projecting upwardly therefrom is a peripheral wall structure 14 which defines an open-top hopper 15 communicating with the grating chamber 13. The hopper 15 is generally rectangular in transverse cross-sectional outline, having a front wall 16, a rear wall 17 and opposed end walls 18 and 19. Integral with the rear wall 17 and extending rearwardly therefrom is an elongated lower handle 20. A shallow notch or recess 21 (FIG. 3) may be formed in the upper end of the rear wall 17 centrally thereof. The grating chamber 13 is open at its opposite ends and the housing 11 defines at one end of the chamber 13 a cylindrical bushing surface 22 and forms at the other end thereof a cylindrical bushing surface 23 which has formed in the outer end thereof an annular recess 24 (see FIG. 3).

The grater 10 also includes an elongated upper handle 25 which is coupled at one end thereof to the distal end of the lower handle 20 at a pivot 26. Integral with the upper handle 25 at the forward end thereof and depending therefrom is a plunger arm 27 which has formed at its distal end a backing plate 28 defining a concave backing surface 29 which, in its as-manufactured condition, is provided with a plurality of outwardly projecting lugs 29a (see FIG. 5).

Disposed in the grating chamber 13 is a grating mechanism, generally designated by the numeral 30, which includes a substantially cylindrical grating tube 31 having a plurality of grating apertures therethrough (not shown), all in a well-known manner. The grating tube 31 is mounted on a frame 32 and cooperates therewith to define a relatively rigid grating drum. The frame 32 includes an end plate 33 substantially annular in shape and provided with a laterally outwardly projecting cylindrical hub 34 dimensioned to be coaxially rotatably received within the cylindrical bushing surface 22. Projecting laterally inwardly from the end plate 33 is a cylindrical, internally threaded well 35. The frame 32 also includes an annular end piece 36 connected to the grating tube 31 at its opposite end, the end piece 36 having a radially outwardly projecting annular flange 37 and provided in its outer surface, just outboard of the flange 37, with a shallow annular groove 38 defining a lip 38a (FIG. 3). The flange 37 is dimensioned to be coaxially rotatably received in the annular recess 24. The end plate 32 is coupled to the end piece 36 by a plurality of circumferentially spaced cross braces 39, four of which are illustrated in FIGS. 3 and 4.

The grating mechanism 30 also includes a crank assembly 40, which includes a crank arm 41 provided at its distal end with a rotatable knob 42, and provided at its opposite end with a generally circular cap plate 43 having an outer diameter greater than that of the cylindrical bushing surface 22. Integral with the cap plate 43 centrally thereof and projecting laterally inwardly therefrom is an externally threaded cylindrical axle 44 adapted to be threadedly engaged in the well 35 of the end plate 33. Also projecting laterally inwardly from the inner surface of the cap plate 43 is a cylindrical stop web 45 which is positioned to abut the outer end of the hub 34 to limit the depth of insertion of the axle 44 in the well 35.

The grater 10 is also provided with a removable cap 47, which may be formed of a suitable flexible and resilient material, such as suitable plastic, the cap 47 being provided with a radially inwardly extending, short, peripheral lip 48 adapted to be snap fitted past the lip 38a of the grating mechanism 30 and into the groove 38 for mounting the cap 47 in place on the grating mechanism 30, as shown in FIG. 3. It can be seen that, when thus mounted in place, the cap 47 cooperates with the crank assembly 40 for closing the opposite ends of the grating chamber 13. The cap 47 may be provided with diametrically spaced, laterally outwardly projecting tabs 49 (FIGS. 1, 2 and 4) to facilitate removal of the cap 47.

Referring also to FIGS. 6–9, there is mounted on the backing plate 28 a seal assembly, generally designated by the numeral 50. The seal assembly 50 includes a seal member 51 (FIGS. 8 and 9) which is substantially rectangular in plan outline, but is arcuate in transverse cross sectional outline, having a concave inner or lower surface 52 and a convex upper or outer surface 52a. The outer surface 52a is designed to mateably nest against the backing surface 29 of the backing plate 28, the seal member 51 having apertures 54 therethrough for respectively receiving the lugs 29a of the backing plate 28. The seal member 51 is dimensioned so that, when disposed against the backing plate 28, it has a peripheral lip 53 which extends outwardly beyond the periphery of the backing plate 28 around its entire perimeter.

The seal assembly 50 also includes a press plate 55 (FIGS. 6 and 7) which is also rectangular in plan outline but is arcuate in transverse cross sectional outline, having a concave outer or lower press surface 56 and a convex inner or upper clamp surface 57 provided with a plurality of outwardly projecting lugs 58. The press plate 55 is dimensioned to be slightly larger than the backing plate 28 but substantially smaller than the seal member 51.

In assembly, the clamp surface 57 of the press plate 55 is fitted against the inner surface 52 of the seal member 51, the lugs 58 being respectively received through the apertures 54 and abutting the lugs 29a on the backing plate 28 for fixed attachment thereto, as by ultrasonic welding. When the press plate 55 and the backing plate 28 are thus secured together, they cooperate to clamp the seal member 51 therebetween. While the backing plate 28 and press plate 55 are dimensioned to be receivable in the hopper 15 with substantial clearance from the peripheral wall structure 14, the peripheral lip 53 projects outwardly beyond the perimeters of the backing plate 28 and the press plate 55, to completely occupy this clearance space, as can be seen in FIGS. 1–4.

In operation, the upper handle 25 and the seal assembly 50 are pivotally moveable between an open or loading condition, illustrated in FIG. 1, wherein the seal assembly 50 is removed from the hopper 15 to permit the insertion therein of food products to be grated, and a closed or pressing position, illustrated in FIGS. 2–4, wherein the seal assembly 50 is disposable in the hopper 15 for engagement with the food articles therein, for pressing them downwardly toward the grating chamber 13 and against the grating tube 31. It will also be appreciated that the user grasps the closed-together handles 20 and 25 in one hand for pressing the food articles against the grating mechanism 30 and, with the other hand, turns the crank assembly 50 for rotating the grating tube 31 for grating the food products. The recess 21 in the rear wall 17 provides clearance to permit the seal assembly 50 to be fully inserted in the hopper 15 until the press plate 55 engages the grating drum. The grated food products then fall through the grating apertures in the grating tube 31 and into the interior thereof, all in a known manner, for discharge from the open end of the grating chamber 13.

Significantly, when the seal assembly 50 moves into the hopper 15, the peripheral lip 53 of the seal member 51 wipes along the inner surface of the peripheral wall structure 14 around its entire perimeter in sealing engagement therewith (see FIGS. 3 and 4), effectively preventing the escape of food particles from around the seal assembly 50 and providing an essentially air-tight seal of the hopper 15, the flexible and resilient nature of the seal member 51 accommodating deflection of the peripheral lip 53 to permit this wiping action. When the cap 47 is also mounted in place, it cooperates with the crank assembly 40 and the seal assembly 50 for effectively sealing both the grating chamber 13 and the hopper 15. Thus, if desired, food products may be left in the grater 10, specifically in the hopper 15 and/or in the chamber 13, and be effectively sealed from exposure to ambient air while the grater and its contents may, for example, be stored in a refrigerator. Thus, for example, if the grater 10 is being used for grating cheese, the cheese, both grated and ungrated, may be stored in the grater 10 until the next use, at which time the cap 47 may be removed to dispense any grated cheese from the chamber 13 and continue grating of cheese in the hopper 15.

In a constructional model of the grater 10, the housing 11 and the upper handle 25 may be formed of any suitable metal or plastic materials, as may the grating mechanism 30. In an embodiment, the cylindrical grating tube 31 is formed of a suitable metal, such as stainless steel, and the seal member 51 is formed of a suitable flexible and resilient material, such as silicone, so that the peripheral lip 53 of the seal member 50 may readily be deformed and deflected to wipe along the inner surfaces of the peripheral wall structure 14. The cap 47 may also be formed of a flexible and resilient material. All of the remaining parts of the grater 10 may be formed of suitable rigid plastic material, such as ABS. In particular, the backing plate 28 and the press plate 55 may be formed of suitable plastic materials to facilitate ultrasonic welding thereof.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A food grater comprising:
   a housing defining a food hopper having a peripheral wall structure,
   grating mechanism carried by the housing and disposed for grating food contained in the hopper,
   a press plate coupled to the housing for movement between an open condition removed from the hopper and a closed condition disposed in the hopper for engagement with food disposed therein, and
   seal structure coupled to the press plate and disposable in wiping sealing engagement with the peripheral wall structure as the press plate is moved between its open and closed conditions.

2. The food grater of claim 1, wherein the seal structure is flexible and resilient.

3. The food grater of claim 2, wherein the seal structure is formed of a plastic material.

4. The food grater of claim 3, wherein the seal structure is formed of silicone.

5. The food grater of claim 1, and further comprising a backing surface, the seal structure being clamped between the press plate and the backing surface.

6. The food grater of claim 5, wherein the press plate is ultrasonically welded to the backing surface.

7. The food grater of claim 1, wherein the seal structure extends beyond the periphery of the press plate.

8. The food grater of claim 1, wherein the peripheral wall structure and the press plate are substantially rectangular in outline.

9. The good grater of claim 1, wherein the press plate is dimensioned so that when it is in its closed condition it cooperates with the peripheral wall structure to define a clearance space therebetween, the seal structure occupying the clearance space when the press plate is in its closed condition.

10. The food grater of claim 1, wherein the seal structure provides a substantially air-tight seal with the peripheral wall structure.

11. A food grater comprising:
    a housing defining a food hopper having a peripheral wall structure,
    grating mechanism carried by the housing and disposed for grating food contained in the hopper,
    a press plate coupled to the housing for movement between an open condition removed from the hopper and a closed condition disposed in the hopper for engagement with food disposed therein, and
    seal structure coupled to the press plate and disposable in wiping sealing engagement with the peripheral wall structure as the press plate is moved between its open and closed conditions,
    the grating mechanism including closure structure for cooperation with the seal structure for substantially sealing the hopper when the press plate is in its closed condition.

12. The food grater of claim 11, and further comprising a first handle extending from the housing, and a second handle coupled to the first handle for pivotal movement relative thereto, the press plate being carried by the second handle for movement therewith.

13. The food grater of claim 11, wherein the grating mechanism is removably carried by the housing.

14. The food grater of claim 11, wherein the housing defines a grating chamber communicating with the hopper and having open ends, the grating mechanism including a grating member disposed in the chamber, a handle structure coupled to the grating member and closing the chamber at one end thereof, and a removable cap associated with the grating member for closing the other end of the chamber.

15. The food grater of claim 14, wherein the grating member is substantially cylindrical in shape, the press plate having a concave curvature mateable with the grating member.

16. The food grater of claim 14, wherein the seal structure cooperates with the handle structure and the cap for sealing the hopper and the chamber.

17. The food grater of claim 11, wherein the seal structure is flexible and resilient.

18. The food grater of claim 11, and further comprising a backing surface, the seal structure being clamped between the press plate and the backing surface.

19. The food grater of claim 18, wherein the press plate is ultrasonically welded to the backing surface.

20. The food grater of claim 11, wherein the seal structure extends beyond the periphery of the press plate.

* * * * *